US006483895B2

(12) United States Patent
Bixler et al.

(10) Patent No.: US 6,483,895 B2
(45) Date of Patent: *Nov. 19, 2002

(54) ELECTRONIC CLASSIFIED ADVERTISING INTERFACE METHOD AND INSTRUCTIONS WITH DIRECT AD ACCESS FOR ADVERTISERS

(75) Inventors: Matthew J. Bixler, Denver, CO (US); Terry F. Trader, Castle Rock, CO (US)

(73) Assignee: Qwest Communications International Inc., Denver, CO (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 09/099,145

(22) Filed: Jun. 18, 1998

(65) Prior Publication Data

US 2002/0048349 A1 Apr. 25, 2002

Related U.S. Application Data

(63) Continuation of application No. 08/370,145, filed on Jan. 9, 1995, now Pat. No. 6,198,977.

(51) Int. Cl.[7] .................................................. H04M 1/64
(52) U.S. Cl. ............... 379/67.1; 379/93.12; 379/114.13
(58) Field of Search ........................... 379/88.13, 88.24, 379/88.17, 92, 93.14, 88.23, 67.1, 114.13, 114.1, 68, 76, 77, 88.18, 88.25, 93.12; 725/42; 345/716

(56) References Cited

U.S. PATENT DOCUMENTS

| | | | |
|---|---|---|---|
| 4,602,129 A | * 7/1986 | Matthews et al. | ....... 379/88.24 |
| 5,177,780 A | 1/1993 | Kasper et al. | ........... 379/88.12 |
| 5,187,735 A | 2/1993 | Herrero Garcia et al. | ............ 379/88.17 |
| 5,193,110 A | 3/1993 | Jones et al. | ............... 379/93.14 |
| 5,195,128 A | 3/1993 | Knitl | ....................... 379/88.24 |
| 5,249,044 A | 9/1993 | Von Kohorn | ................. 725/23 |
| 5,283,731 A | 2/1994 | Lalonde et al. | ......... 379/100.11 |
| 5,361,295 A | 11/1994 | Solomon et al. | ........... 379/67.1 |
| 5,404,393 A | 4/1995 | Remillard | ................ 379/93.25 |
| 5,412,416 A | 5/1995 | Nemirofsky | .................. 725/36 |
| 5,412,720 A | 5/1995 | Hoarty | ........................ 380/211 |
| 5,438,355 A | 8/1995 | Palmer | ........................ 725/110 |
| 5,438,615 A | 8/1995 | Moen | ..................... 379/114.23 |
| 5,448,625 A | 9/1995 | Lederman | ................. 379/88.25 |
| 5,481,296 A | 1/1996 | Cragun et al. | ................. 725/24 |
| 5,508,731 A | 4/1996 | Kohorn | ........................ 725/24 |
| 5,553,120 A | 9/1996 | Katz | ........................ 379/88.09 |
| 5,583,922 A | 12/1996 | Davis et al. | .............. 379/93.09 |
| 5,592,375 A | 1/1997 | Salmon et al. | ................... 705/7 |
| 5,999,908 A | * 12/1999 | Abelow | ......................... 705/1 |
| 6,198,977 B1 | * 3/2001 | Bixler et al. | ................. 345/716 |

FOREIGN PATENT DOCUMENTS

| | | | | |
|---|---|---|---|---|
| WO | WO94/15294 | * | 7/1994 | ............ H04M/3/42 |
| WO | 9305290 | | 10/1994 | ............ H04M/1/64 |

OTHER PUBLICATIONS

Ameritech Publishing Introduces Audiotex Service, PR Newswire, Nov. 28, 1988.
OCTel, User Reference Manual, Octel Communication Corporation, 11/94.

* cited by examiner

Primary Examiner—Fan Tsang
Assistant Examiner—Ovidio Escalante
(74) Attorney, Agent, or Firm—Brooks & Kushman P.C.

(57) ABSTRACT

An interface for an electronic classified advertising system. The interface includes a feature which allows an advertiser to enter the system and input an access number to hear all of the advertisements which the advertiser has on the system. The advertiser is then prompted to indicate satisfaction or dissatisfaction after each ad is played.

2 Claims, 15 Drawing Sheets

ELECTRONIC CLASSIFIED ADVERTISING INTERFACE METHOD AND INSTRUCTIONS WITH DIRECT AD ACCESS FOR ADVERTISERS

CROSS-NOTE TO RELATED APPLICATIONS

This application is a continuation of U.S. application Ser. No. 08/370,145, filed Jan. 9, 1995 now U.S. Pat. No. 6,198,977.

BACKGROUND OF THE INVENTION

1. Field of the Invention

This invention relates to the field of computers and data processing systems. More particularly the invention relates to business practice and management applications. In still greater particularity, the invention relates to electronic classified advertising systems. By way of further characterization but not by way of limitation thereto, the invention is a buyer/advertiser interface for electronic classified advertising.

2. Description of the Related Art

Classified advertising has been utilized by the print media for many years. In particular, newspapers and magazines utilize this device to generate revenue from individuals or other relatively small sellers who could otherwise not afford to advertise goods and services they wish to sell. Classified advertising has also served buyers in allowing them access to goods or services from these individuals or small sellers. Classified advertising is also used by large volume sellers to reach users who look to such advertising for items such as homes or automobiles. Thus, classified advertising has proven very useful over the years in bringing buyers and sellers together.

Some publications such as newspapers have attempted to augment their printed classified advertising by offering telephonic electronic classified advertising. Electronic classified ads are intended to allow sellers of goods and services the ability to augment their print ad with an audio ad. Electronic classified advertising may solve many needs that are currently unmet by print ads alone. For example, the potential buyer can hear more detail about the product or service being offered than is included in the printed ad. Thus, the buyer is able to hear more detail without having to talk directly to the seller. The electronic ad can be updated frequently to show changes in price or availability of the goods and/or services. Advantages such as these allow the publication to have greater success in selling its classified ads.

Existing electronic classified advertising systems have thus helped publishers to sell their advertising, sellers to sell their goods and services, and buyers to purchase same. However, existing electronic classified advertising systems such as those using voice messaging systems have some limitations which inhibit their usefulness. Some existing systems utilize a standard voice mailbox interface which requires the buyer to call a telephone number each time he wishes to listen to an ad, be it the same ad or a different ad. These systems also play the ad only once and then require the buyer to leave a message for the seller, hang up or transfer to another mailbox. If the buyer wishes to hear other classified ads listed in the classified advertising publication, she must either wait until after the message prompt (either leaving a message or not) and dial a mailbox number to access each of those ads or, in some systems, he must hang up and call again.

One of the limitations of prior art electronic classified systems is their complexity and lack of flexibility. In general these systems are difficult to use. The easier the system is to use the more it will be used. Prior art systems allow a buyer to enter certain criteria which the buyer requires for the item he wishes to purchase. Once the user/buyer has entered these criteria these systems allow the buyer to "save" the search criteria in the system. These systems allow the user to store these criteria for a certain time period and to access the stored criteria from the system. These prior art systems delete the search criteria after a predetermined period of time. Even after accessing a saved search, if the user does not find the item in the system and wishes to keep searching as new items are added she must re-access the system each time (daily, weekly, etc.). Numerous fruitless searches and the resultant loss of time may result in the user abandoning the search.

SUMMARY OF THE INVENTION

The invention includes a method and instructions for allowing a buyer and advertiser to more easily interface with an electronic classified advertising system. The system allows the user to manipulate the list of ads to be played by deleting, saving, skipping forward or backward within an ad, and by employing a pause/resume option.

In order to facilitate contact of the user with the advertiser the system allows the users to press a key on the DTMF (Dual Tone Multifrequency) keypad to directly connect the user to the advertiser telephone listed in the ad without having to hang up and dial the telephone number.

In order to make the system easier to use by the advertiser, the system allows the advertiser direct access to his advertisement. Once the ad is placed in the system, the advertiser can access the system to listen to the ad for accuracy and completeness. When an advertiser wants to change, update or delete an ad they may press a predetermined key on the DTMF keypad to access the system or system operator to make the modification.

To prevent the buyer/user from having to listen to all of the ads available on the system, the buyer can input key search criteria on their touch-tone telephone keypad and listen to only those ads that meet their criteria. Examples of search criteria for automobiles are: vehicle make; model; year; and type. For homes or rentals the search criteria may include: number of bedrooms; number of bathrooms; price; and neighborhood. Buyers may also elect not to listen to ads without a price. At the user's request, the system will save the buyer search criteria so it can be used in future searches on the system.

The improved electronic classified system of the present invention allows users the option of being notified if ads subsequently added to the system meet the saved search criteria. That is, as users listen to ads on the audio electronic classified service, the existing ads may not meet their personal preferences or search criteria. The user can request the system to save the search criteria as with prior art systems. Unlike prior art systems however, the user can request notification if an ad meeting the search criteria subsequently is added to the system. That is, as ads are added to the system, these new ads may meet the search criteria saved from a previous call by the user. The user may request the system to contact her by telephone or fax to advise her that an ad meeting her search criteria is now in the system.

BRIEF DESCRIPTION OF THE DRAWINGS

FIGS. 4a–4f together are a flow chart illustrating the auto locator interface;

FIGS. 7a–7c together are a flow chart illustrating the direct ad access interface.

DESCRIPTION OF THE PREFERRED EMBODIMENT

Figure 1:
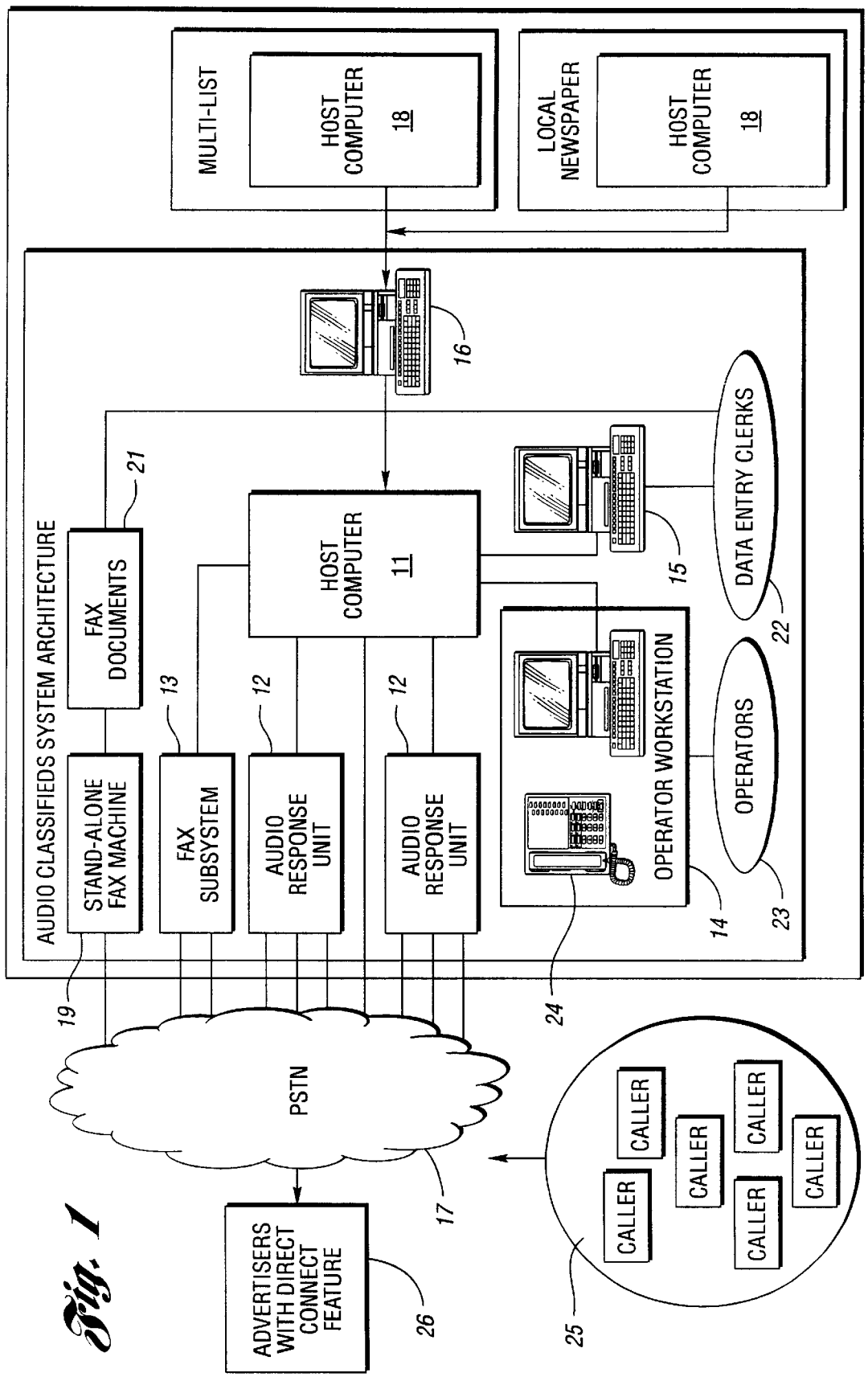
FIG. 1 is a schematic of the system architecture.

Referring now to the figures wherein like reference numerals denote like structure throughout each of the various figures, FIG. 1 illustrates the electronic classified advertising system architecture. Referring to FIG. 1, a host computer 11 is connected to audio response units 12, fax system 13, operator workstation 14, data workstation 15, listing workstation 16, and public switched telephone network (PSTN) 17. A host computer 18 from a service provider such as the multi-list and/or local newspaper is connected to host computer 11. A facsimile (fax) machine 19 for faxing documents 21 is connected to PSTN 17 and is accessible to data clerks 22 at workstation 15. Operators 23 at workstation 14 are connected to PSTN 17 through telephones 24. Users of the system which may include buyers 25 and advertisers 26 access the system through PSTN 17.

In operation, the potential users which may include individual buyers or sellers 25 or larger entities 26 call into the system to either place ads or to access the ads on the system. For example, a seller may call a local newspaper to have an ad entered into host computer 11. Computer 11 stores the ads which may be played to the callers through audio response units 12. Faxes may be sent to the callers by fax machine 19 through PSTN 17. For real estate ads the multilist computer 18 provides the listings and updates them to host computer 11. Operators 23 interface with the callers through telephone 24 and may access the electronic classified system through the PC at workstation 14. Data entry clerks 22 also input information on ads into the system through PC 15 and may send or receive faxes from fax machine 19.

Figure 2:
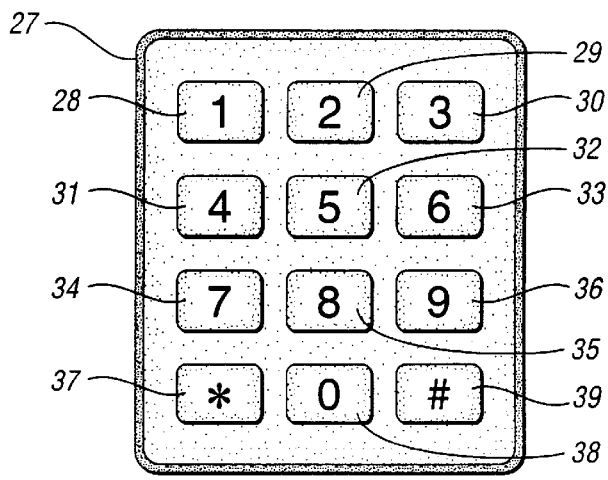
FIG. 2 illustrates a Dual Tone Multifrequency (DTMF) keypad.

Referring to FIG. 2, a Dual Tone Multifrequency (DTMF) keypad 27 is shown including keys 28–39 which represent keys 1–9 and the *, O, and # pound keys. These keys and their use are known in the telephone art. The use of the keys is similar to that for voice messaging systems as is also known in the art.

Figure 3A:
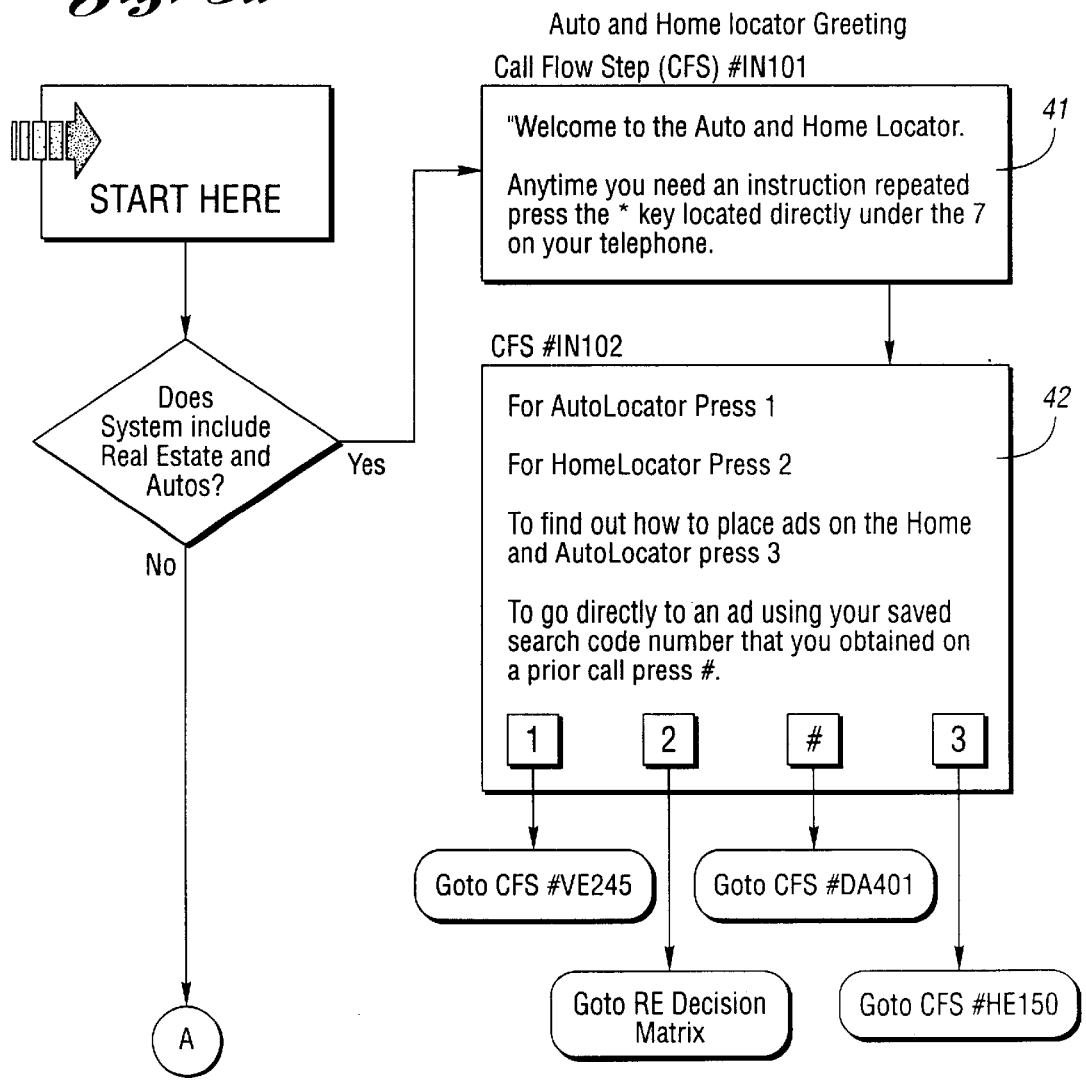
FIGS. 3a–3b together are a flow chart illustrating system access interface.
Figure 3B:
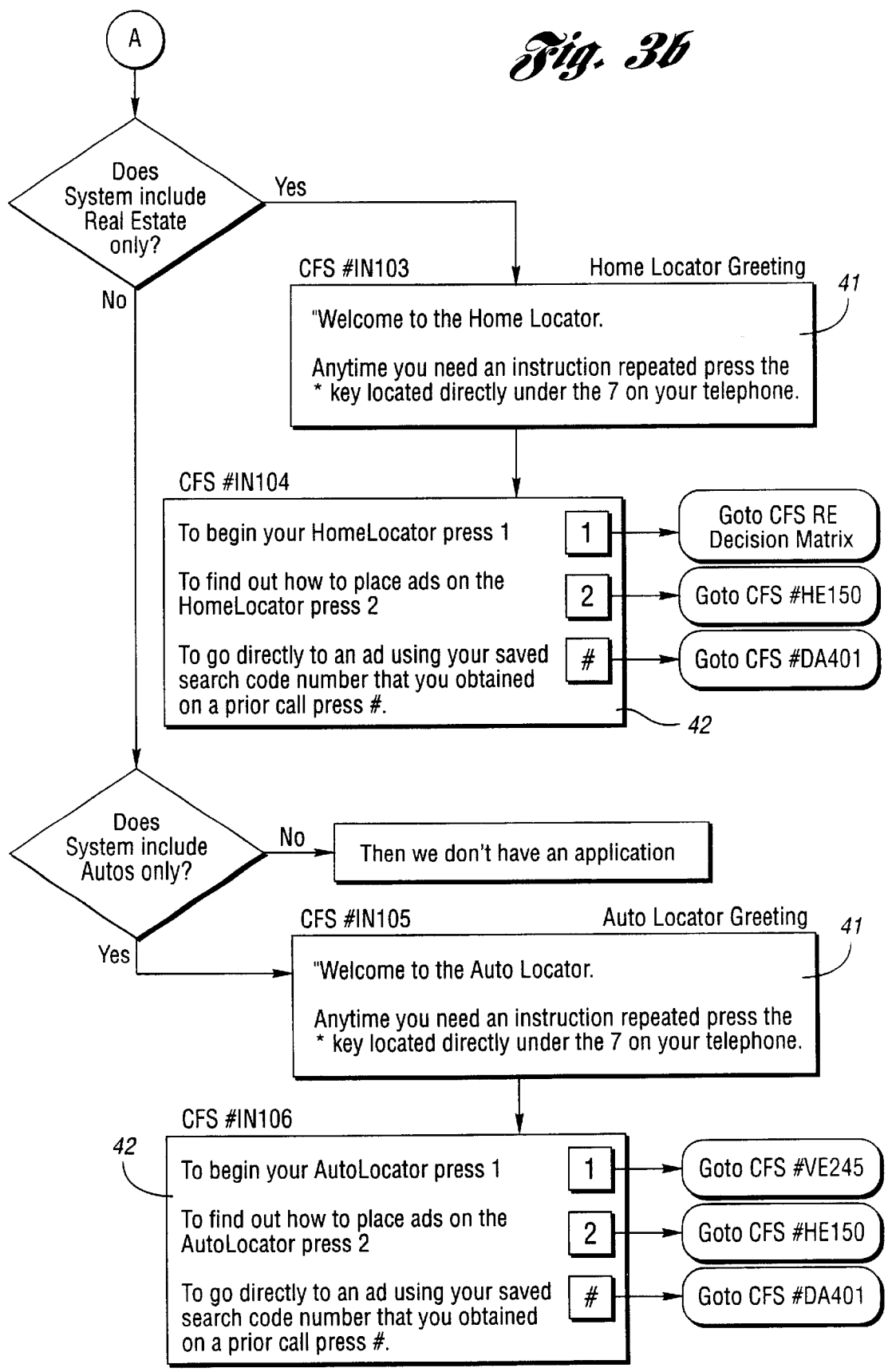

Referring to FIGS. 3a–3b, when a user dials into the system he or she is greeted as is shown in one of boxes 41 depending upon which system is in use. That is, the system may include an auto locator, a home locator, or both. For ease of description herein the system will be described with respect to an auto locator although it may include either or both an auto locator and a home locator interface. The auto locator interface will be used to illustrate the features of the invention although in practice the home locator interface contains the same features. Referring to FIGS. 3a–3b, the user is instructed in step 42 to press a DTMF key in order to access one of the functions in the system. If the user presses DTMF key 1(28) he is placed into the auto locator system of FIGS. 4a–4f. If the user has previously saved a search on the system and wishes to utilize the saved search criteria she is instructed to press the # key (39) and is then to the direct ad access discussed in FIGS. 7a–7b below.

Figure 4A:
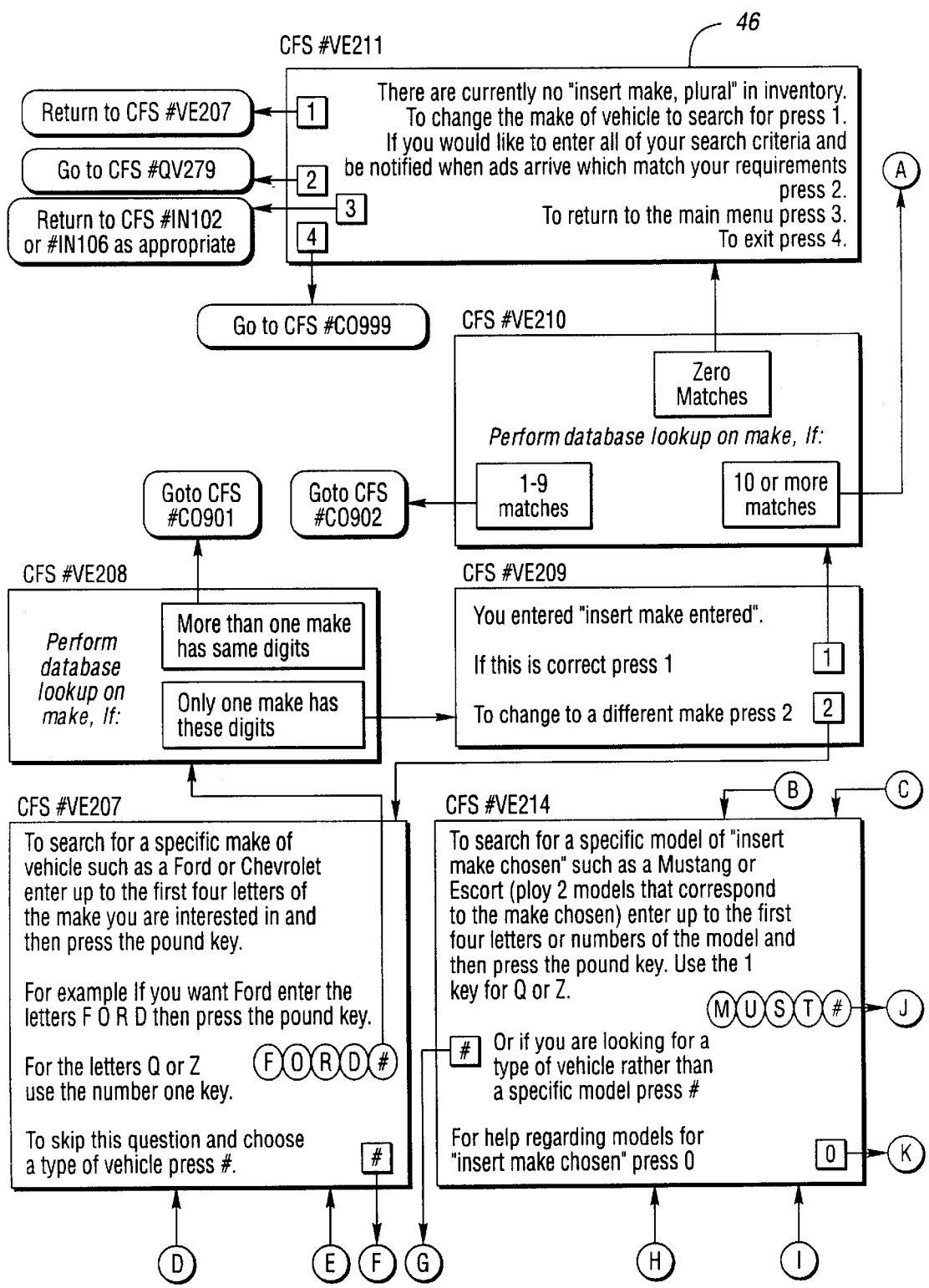
Figure 4B:
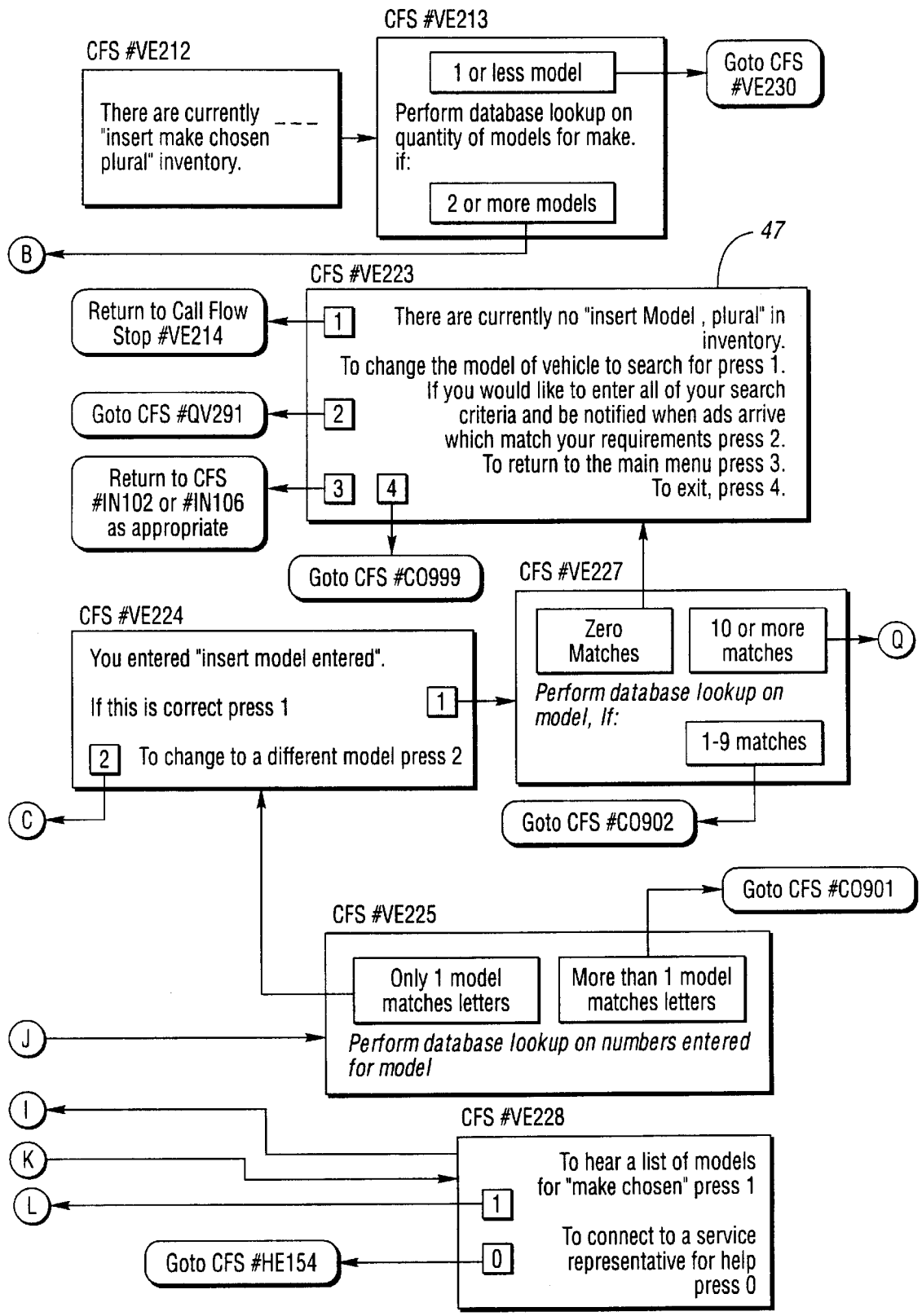
Figure 4C:
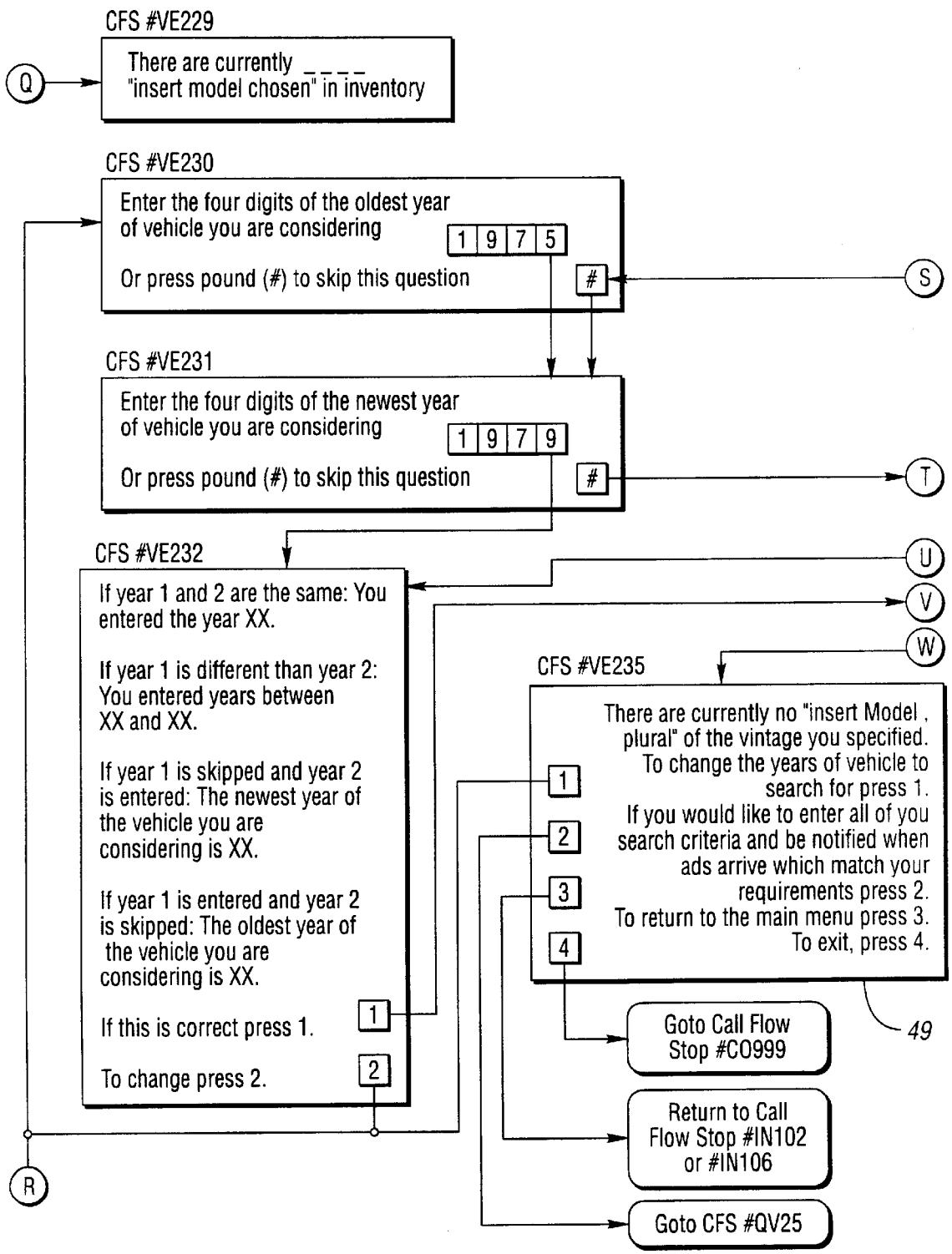
Figure 4B:
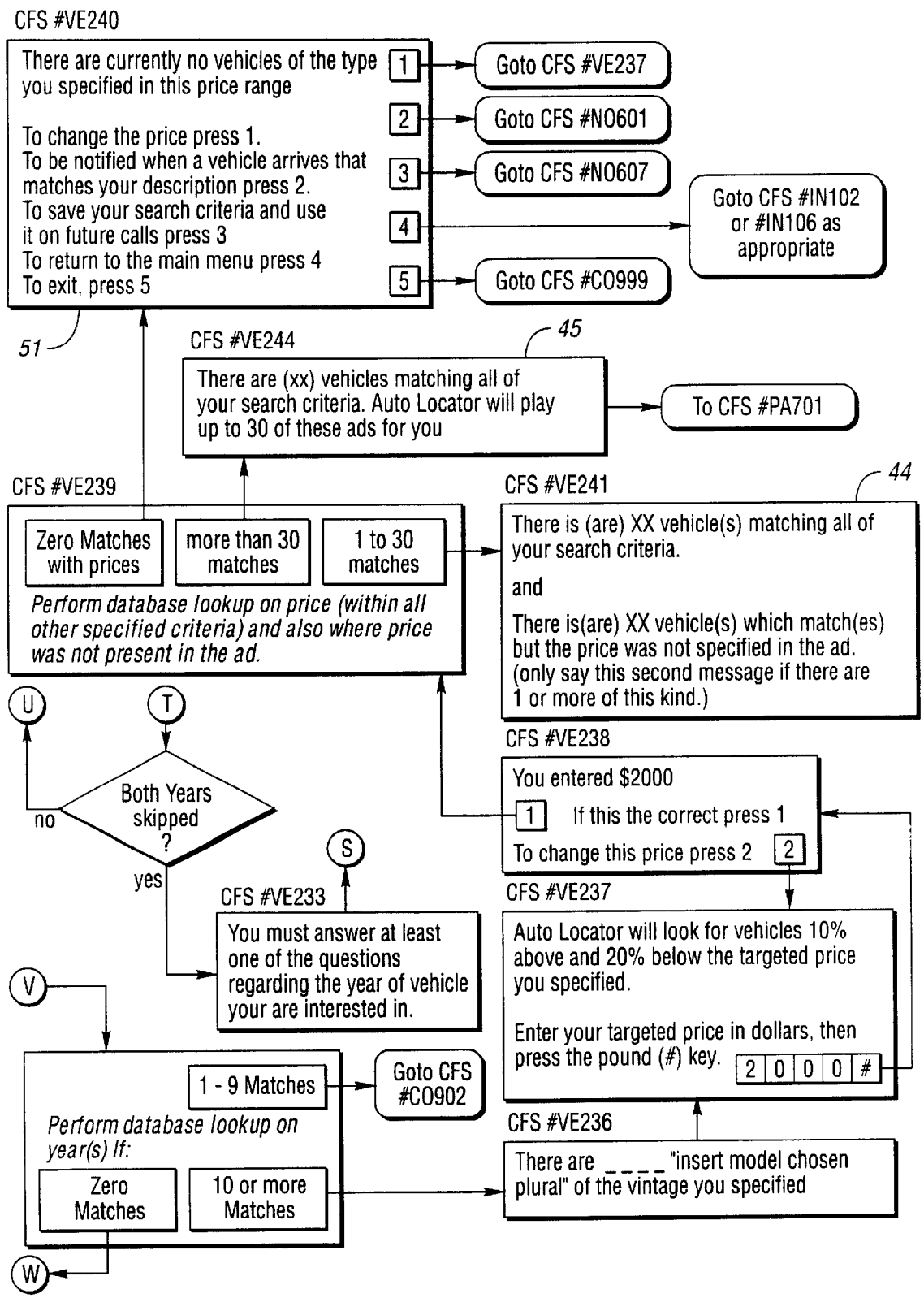
Figure 4E:
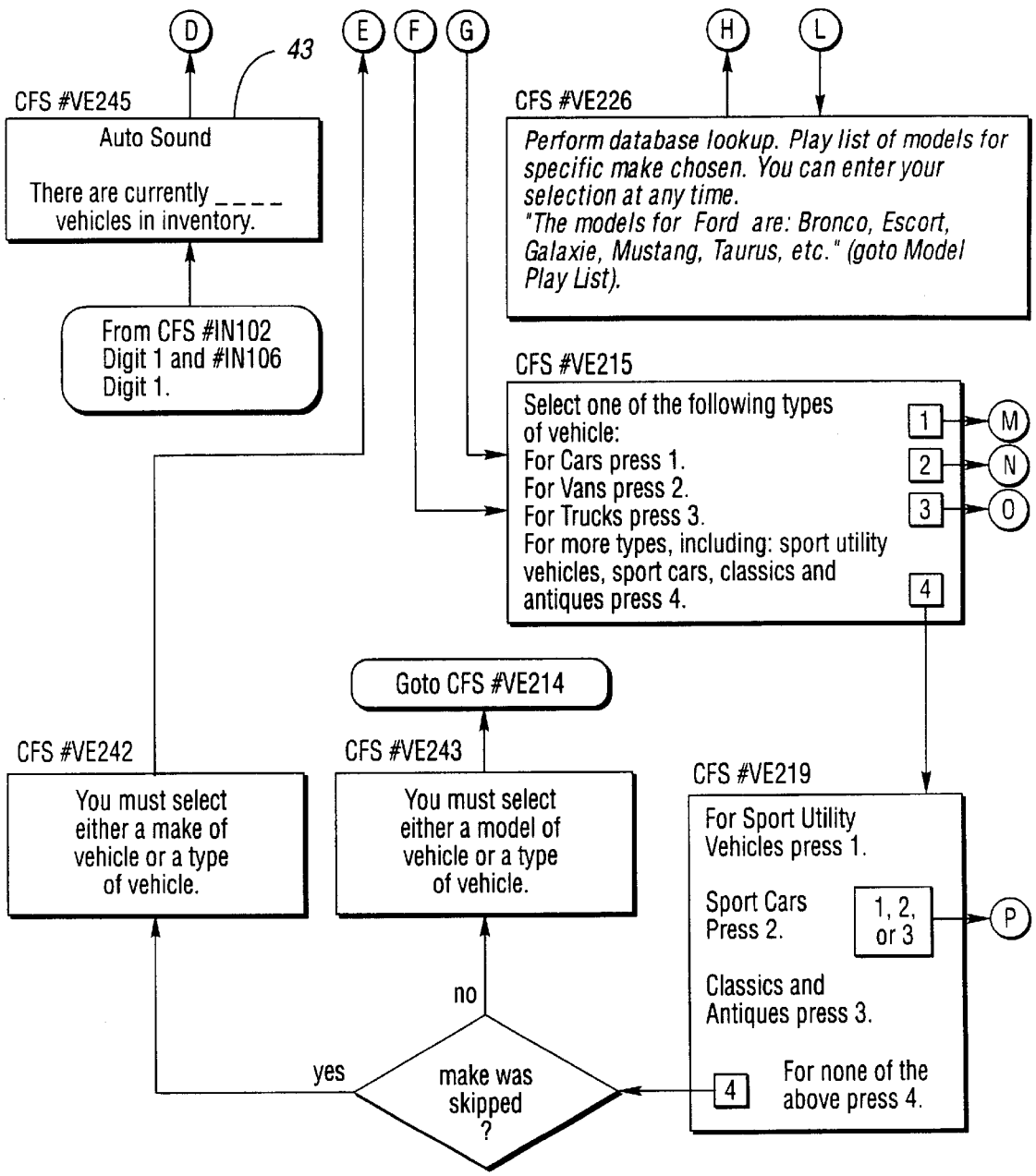
Figure 4F:
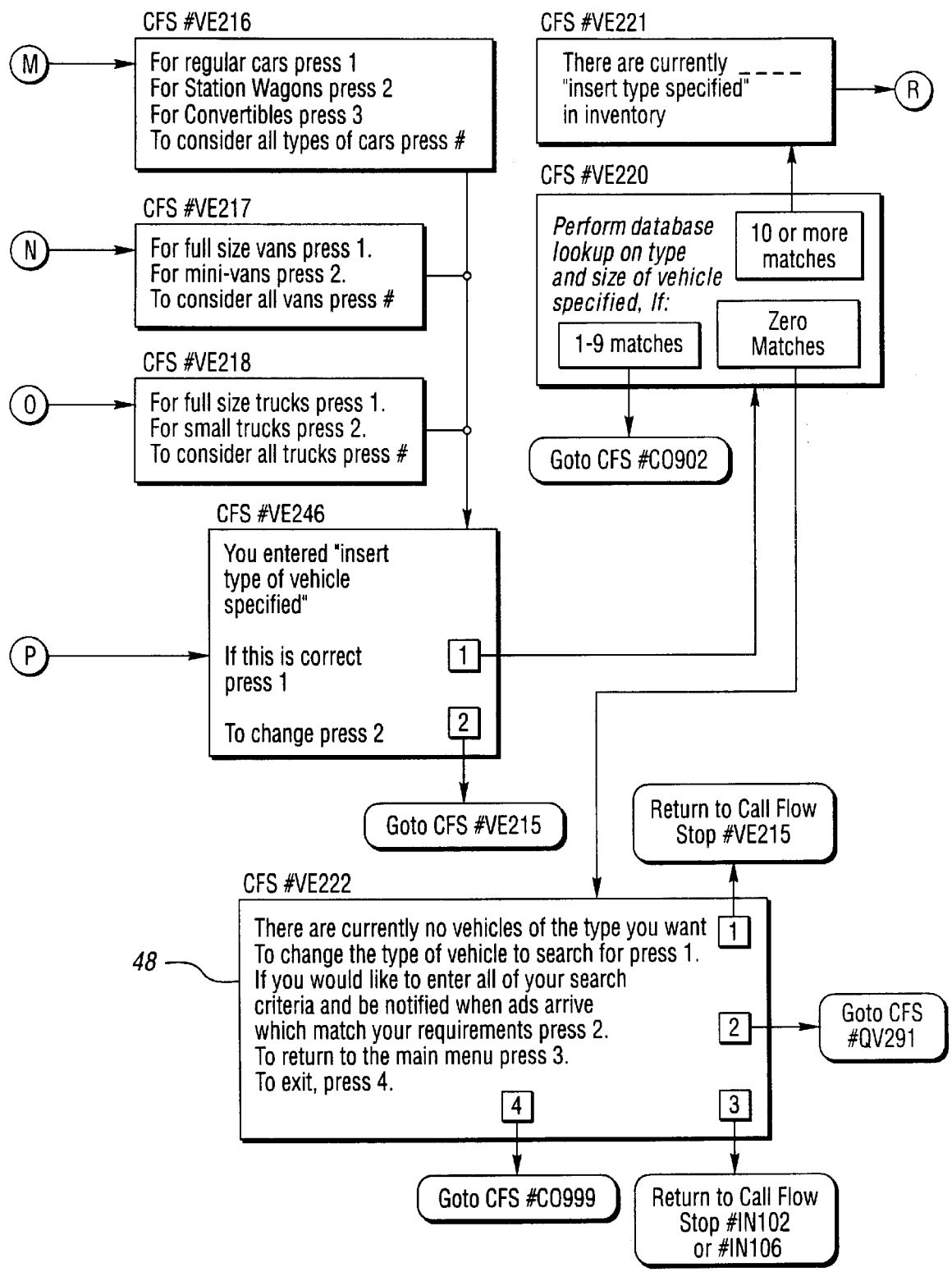

Referring to FIGS. 4a–4f, more specifically FIG. 4c the auto locator system begins at step 43 with an indication of the number of vehicles currently in inventory. Most of the rest of the flow chart directs the user to enter specific criteria for locating the type of vehicle he or she desires as is known in the art. This search criteria allows the host computer to search the database to determine if there are any ads which meet the users criteria. If there are one or more ads which meet the search criteria then the user is so advised in steps 44 and 45 as shown in FIG. 4d. The user is then taken to the play ad flow chart (FIGS. 5a–5b) discussed below.

Referring again to FIGS. 4a–4f, if, during the selection of search criteria by the user, no ads meeting the search criteria up to that point are found by the system, then the user is so advised. For example, at step 46 depicted in FIG. 4a, if no ads are in the system which are of the make of automobile desired by the user, then the user is so informed and he is given the opportunity to save the search criteria and be notified when ads arrive which are of the desired automobile make. The user also has the options (in step 48) of saving search criteria and being notified if ads have been successfully retrieved. In order to request this notification from the system the user is instructed to press a predetermined key on DTMF keypad 27. In this instance the user is instructed to press key 2 (29, FIG. 2) in order to select this notification option. Similarly, at other points in the search the user is given this notification option. For example, at step 47, as shown in FIG. 4b if the model selected is not matched by an existing ad, the user may select the notification option. Similarly, as shown in FIGS. 4c–4f for vehicle type in step 48 and for vehicle vintage in step 49 the user is given the notification option.

The final search criteria is price and if no match is found then the user is given the option to save the entire search in step 59 and to be notified when a vehicle ad is entered that meets all of the search criteria. When the user selects the notification option at any point in the search he is taken to the notification flow chart menu in FIG. 6 discussed below.

Figure 5A:
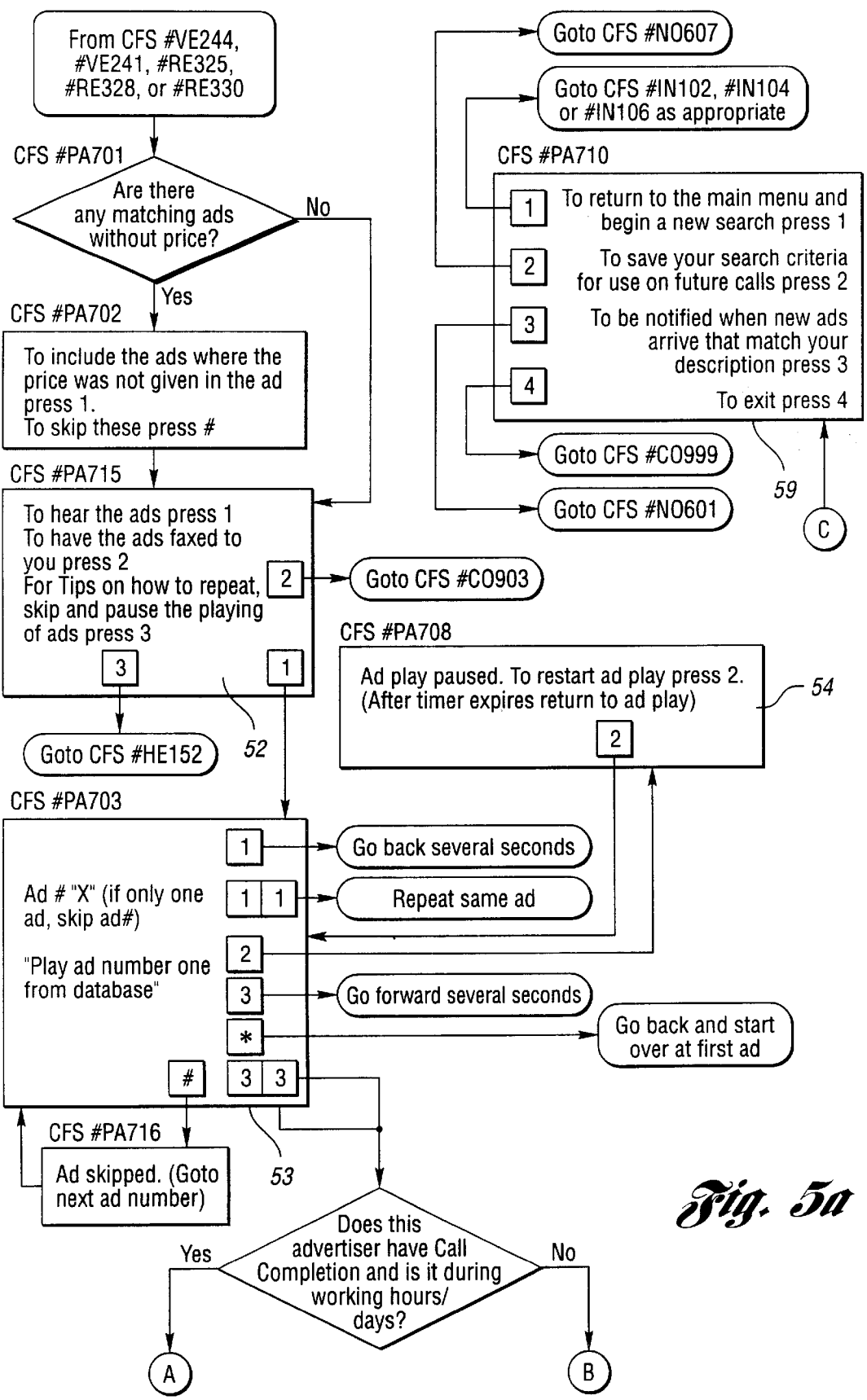
FIGS. 5a–5b together are a flow chart illustrating the play advertisements interface.
Figure 5B:
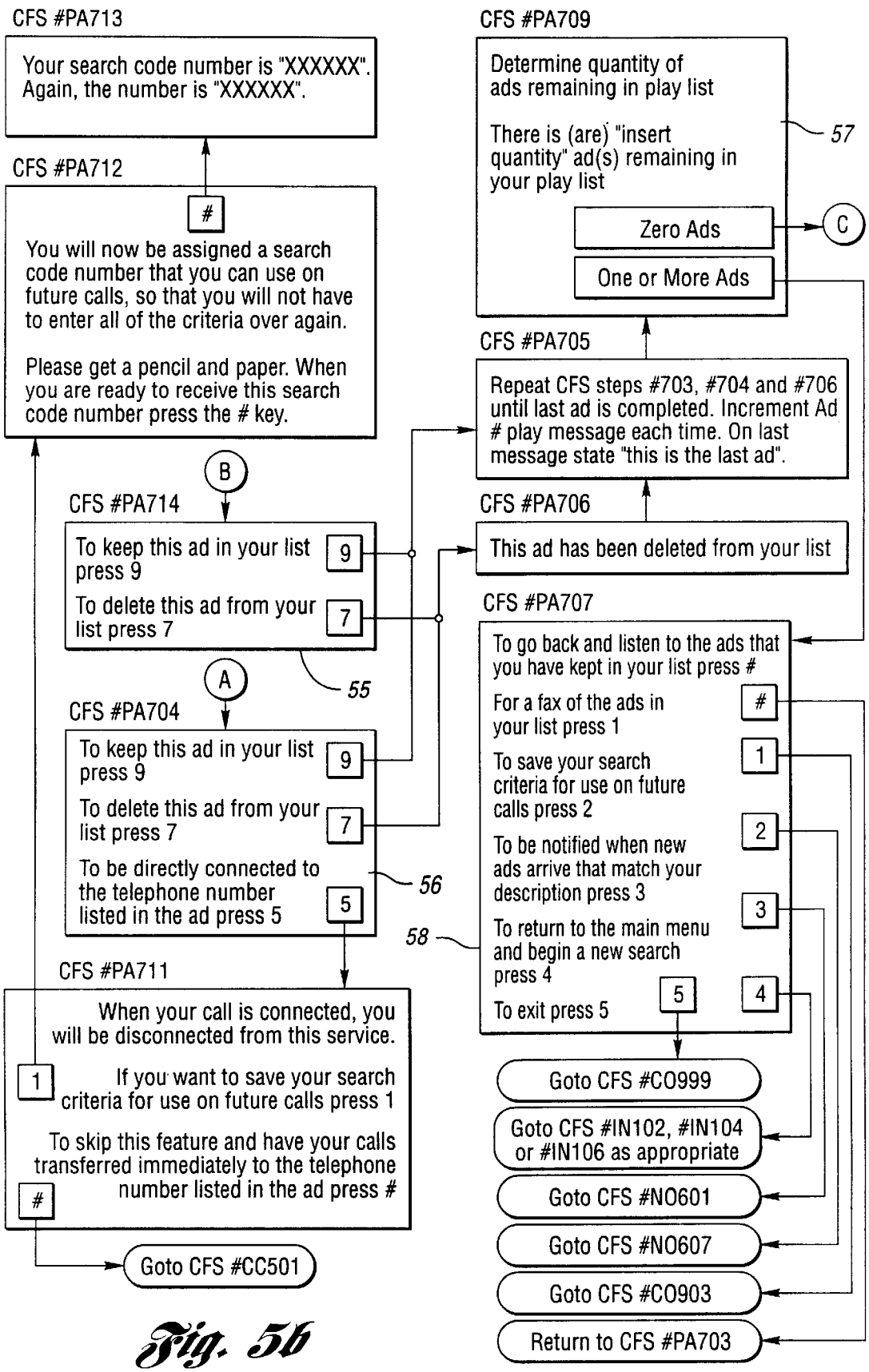

Referring to FIGS. 5a–5b, the flow chart illustrating the interface to allow the user to play advertisements which he has selected or which meet her criteria is illustrated. That is, if the user criteria matches an ad in steps 44 or 45 of FIG. 4d, then the user may playback the actual ads by interfacing with the system as shown in FIGS. 5a–5b. The instructions in step 52 of FIG. 5a instruct the user to press key 1 (28, FIG. 2) in order to hear the ads. By pressing the designated DTMF keys as listed in step 53, the user may control playback functions such as deleting, saving, skipping forward or backward in the ad and pausing the ad. For example, by pressing key 1 (28) the user can skip backward a few seconds in the ad to hear the passage again. By pressing key 1 twice the user can repeat the entire ad. By pressing 2 (29) the user can pause the ad as shown in step 54 and then restart it either by pressing 2 again or the system will do it automatically after a predetermined time. If the user elects to press 3 (30) in step 53 the ad will fast forward or skip a few seconds. If the user elects to press the star key (37) then the system will return to the first ad on the list and begin replay. If the user presses the # key (39) the current ad is skipped and the next ad on the list is played. If, in step 53 the user elects to press the 3 key (30) twice, then she is taken to steps 55 or 56 depending upon whether the advertiser has a direct connect feature. As shown in FIG. 5b in either step 55 or 56 the user is instructed to press key 9 (36) to save the ad or key 7 (34) to delete the ad from the list of ads. If the advertiser has a direct connect feature the user is instructed to press 5 (32) in step 56 to be automatically connected to the advertiser.

After as shown in FIG. 5b the ads in the play list have been heard the user is advised of the number of ads in the list in step 57. By following the prompts in step 58, the user may then elect to hear the ads again or to begin a new search, to save the existing search, to receive a fax of the ads or to be notified when a new ad arrives in the system which meets the search criteria of the current search as in steps 46–48 and 51. If the notification option is elected then the user is taken to the notification menu (FIG. 6).

Figure 6:
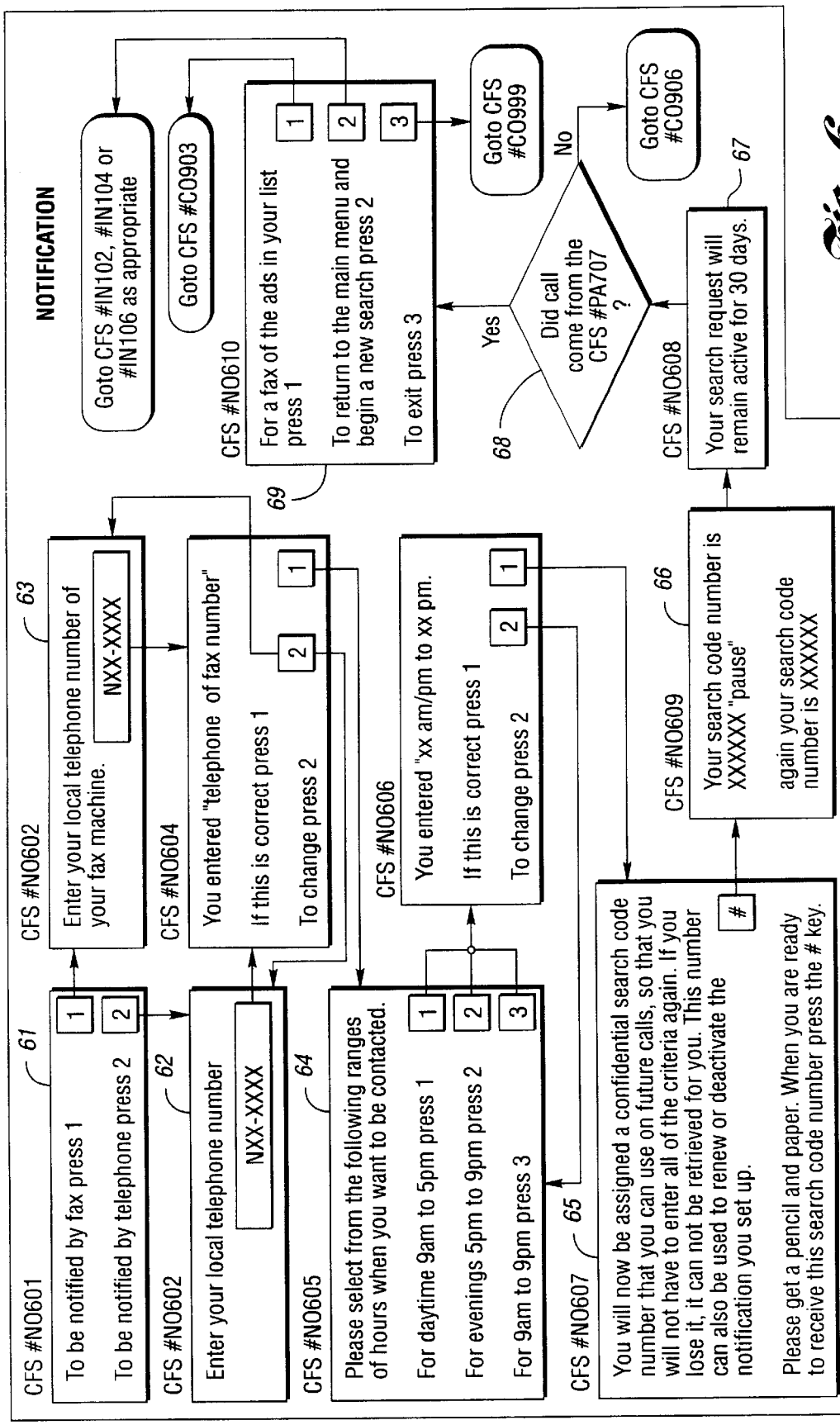
FIG. 6 is a flow chart illustrating the notification interface.

Referring to FIG. 6, the user is instructed at step 61 to select notification by fax or telephone. The user then enters the telephone or fax numbers as instructed in steps 62 and 63. In step 64 the user is given the option to select the time of day during which he wishes to receive the notification. In step 65 the user is advised that a search code will be assigned and it is assigned in step 66. Step 67 advises the user that the search will be saved for a predetermined time. Referring to FIGS. 5a–5b, it should be noted that, in step 51, if a user elects to save a search she is taken directly to step 65. In step 68 the system determines whether the user has listened to the ad(s) through the steps in FIGS. 5a–5b and if the user has been through step 58. If so, then the search is saved and the user is prompted in step 69 to press the appropriate key to receive a fax of the ads, to return to the main menu or to exit the system. If the user has come from some other step in the system such as step 51, then she is instructed to press a key to either exit the system or to return to the main menu of FIGS. 3a–3b. If the user returns to FIGS. 3a–3b then she is taken to one of steps 42 depending upon whether the system includes an auto or home system or both. As stated above the choice of an auto or home locator system is a matter of design choice and other items or services may be offered using the claimed system without departing from the scope of the invention.

Figure 7A:
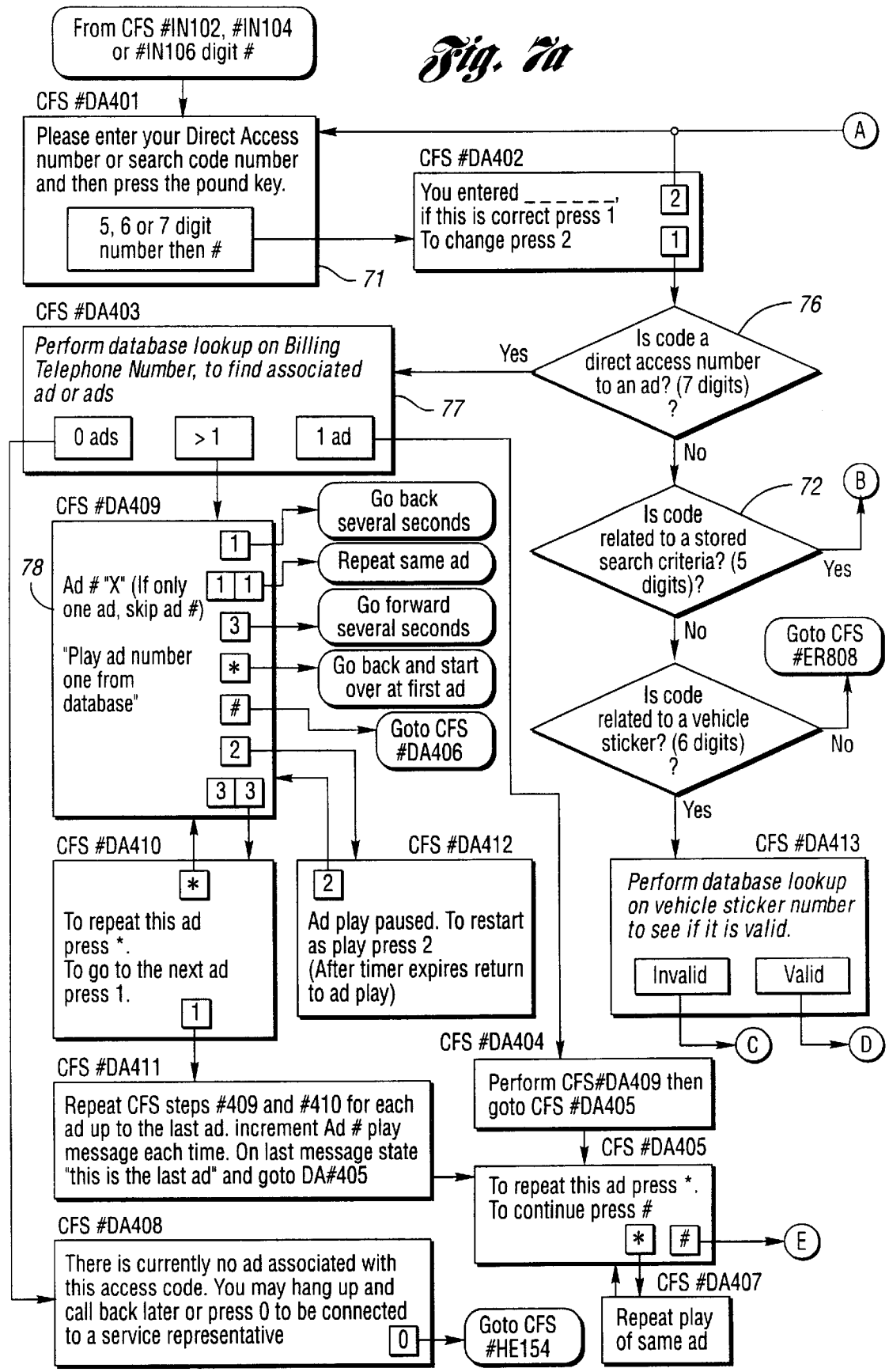
Figure 7B:
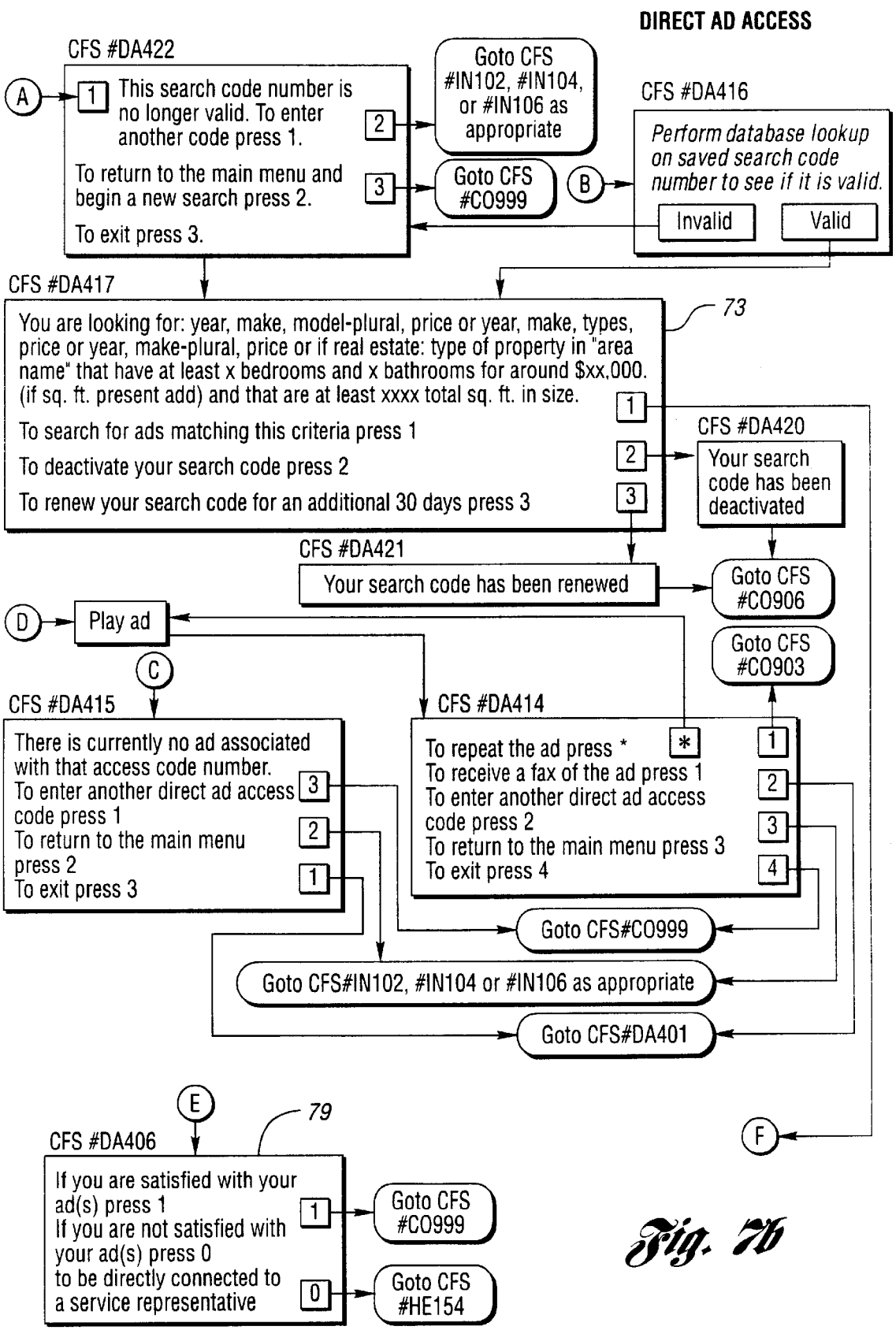

Referring to FIGS. 7a–7b, if a user has selected a saved search function by pressing the # key (39) in FIGS. 3a–3b (step 42) then the system requests the search code to be entered in step 71, FIG. 7a. If the search code is for a saved search as determined by the system in step 72 then the system will repeat the saved search criteria in step 73, FIG. 7b, and request the user to press the appropriate key to search for ads matching the criteria or to remove the search or to renew the search code for an additional period of time. If the user elects to search then the system performs the search and the user is advised of the results and returned to steps 44 or 45 in FIG. 4d depending upon the number of matches found. If no matches are found then the user is so advised in step 75 and given the option to return to the main menu (FIGS. 3a–3b) or to exit the system.

A unique feature of the present invention allows the advertiser to directly access all of his ads on the system. The advertiser may wish to directly access the ad(s) to check for mistakes in the ad or to hear how the ad sounds. The advertiser will be given its direct ad access number (billing number) upon entering the ad in the system by one of the operators 23, data clerks 22 or other system personnel. As shown in FIG. 7a if the system determines in step 76 that the entered code is a direct ad access, then the system will search for all of the ads which that advertiser has on the system in step 77. The advertiser will then be given the same options in replaying the ad(s) that the user was given in step 53 of FIGS. 5a–5b with minor differences. That is, if the advertiser presses the # (39) key, she is queried whether the ad is satisfactory at step 79. This query is repeated after each ad is heard. If the ad is not satisfactory the advertiser is connected to a service representative 22 or 23 by pressing O (38). If the ad is satisfactory then the advertiser presses key 1 (28) and the next ad is played or, if this is the last ad, then the advertiser is taken to system exit.

Figure 8:
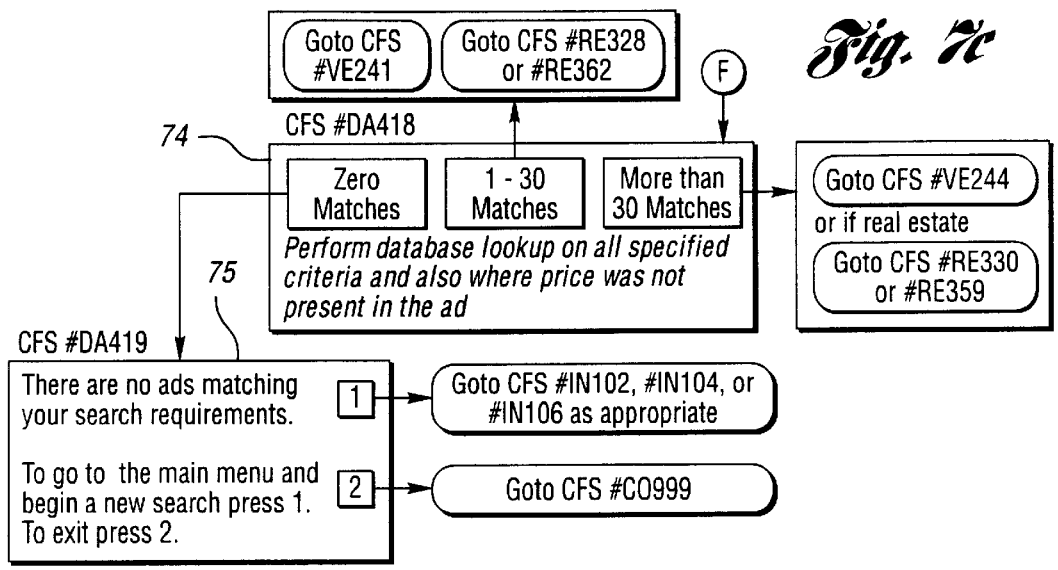
FIG. 8 is a schematic of an interactive television application of the invention.
Figure 8:
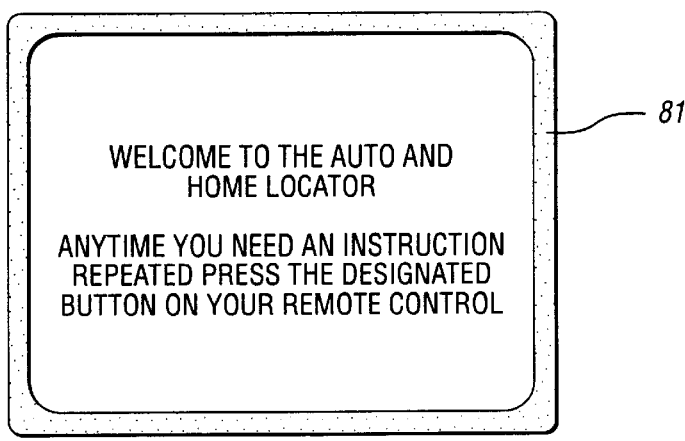
Figure 8:
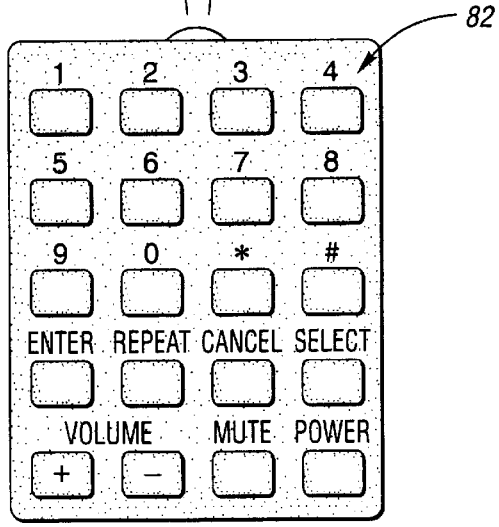

The invention has been disclosed with respect to a preferred embodiment thereof. However, it is not to be so limited as changes and modifications may be made which are within the full intended scope of the invention as defined by the claims. For example, while an auto and home interface have been described, the invention may be used for other goods and services such as furniture, appliances, sporting goods etc. In addition, while the invention has been described with respect to a telephone interface, it is equally applicable to other media. Referring to FIG. 8, the interface could be provided using a television screen 81 with the remote control buttons 82 serving the same function as the DTMF keypad 27. Interface instructions could be supplied audibly as with the telephone interface or visually on the television screen. The ads could then be displayed on the television screen.

What is claimed is:

1. A method utilizing a DTMF telephone keypad to allow an advertiser to access a plurality of advertisements in a public switched telephone network electronic classified advertising system comprising the steps of:

accessing said electronic classified advertising system;

prompting said advertiser to enter a code on said DTMF keypad;

determining if the entered code is a valid advertiser code;

searching for a plurality of advertisements in said electronic classified advertising system associated with said advertiser code;

playing said plurality of associated advertisements to said advertiser;

prompting said advertiser to press a predetermined DTMF key to indicate satisfaction with an associated advertisement;

prompting said advertiser to press a predetermined DTMF key to indicate dissatisfaction with an associated advertisement;

prompting said advertiser to press one or more keys to skip forward or backward within an advertisement;

prompting said advertiser to press one or more keys to pause the playback of an advertisement and sending a copy of said plurality of associated advertisement to said advertiser upon pressing a predetermined DTMF key.

2. A method according to claim 1 wherein said step of prompting said advertiser to press a DTMF key to indicate dissatisfaction with an associated advertisement further includes the step of connecting said advertiser to a service representative.

* * * * *